United States Patent [19]

Amore et al.

[11] Patent Number: 5,400,986
[45] Date of Patent: Mar. 28, 1995

[54] OPTICAL SOLAR REFLECTOR AND MOUNTING METHOD

[75] Inventors: Leo J. Amore, Phoenixville; William P. Saylor, Sanatoga, both of Pa.

[73] Assignee: Martin Marietta Corporation, East Windsor

[21] Appl. No.: 14,645

[22] Filed: Feb. 8, 1993

[51] Int. Cl.$^6$ .............................................. B64G 1/44
[52] U.S. Cl. ............................... 244/173; 244/158 R; 136/243; 136/244
[58] Field of Search .......................... 244/173, 158 R; 136/243, 244, 245, 251

[56] References Cited

U.S. PATENT DOCUMENTS

| | | | |
|---|---|---|---|
| 3,346,419 | 10/1967 | Webb | 244/173 |
| 4,043,834 | 8/1977 | Rüsch | 136/245 |
| 4,232,070 | 11/1980 | Inouye et al. | 244/173 |
| 4,888,061 | 12/1989 | Wenz | 136/245 |
| 4,898,347 | 2/1990 | Bianchi | 244/173 |

FOREIGN PATENT DOCUMENTS

2224391  5/1990  United Kingdom ................ 136/245

OTHER PUBLICATIONS

"Microsheet Glass in Solar Concentrators," published in NASA Tech Briefs, Feb., 1993, by Lewis Research Center.

*Primary Examiner*—Michael S. Huppert
*Assistant Examiner*—Anne E. Bidwell
*Attorney, Agent, or Firm*—W. H. Meise; C. A. Berard; S. A. Young

[57] ABSTRACT

A thermal control surface for a spacecraft includes flexible OSR tiles (310) 0.0015 inches thick. Each tile includes a transparent substrate (312) with a reflective second surface (314), such as a coating of silver. The front or space-facing side is coated with a transparent, electrically conductive layer (316) of indium oxide (IO) or indium-tin oxide (ITO), which laps over the edges of the OSR tile, and is in electrical contact with the reflective coating.

The IO or ITO coating, or a separate electrically conductive coating (610) such as nichrome, forms a protective coating for the reflective surface, and maintains contact with the front surface of the tile. The IO or ITO layer (316) in conjunction with the back side coating provides front-to-back electrical conduction. The OSR is mounted to an electrically conductive surface (110) of the spacecraft, such as an aluminum or graphite-fiber-reinforced epoxy resin, by a sheet of transfer adhesive (410). In one embodiment of the invention, the transfer adhesive is electrically conductive, thereby providing an electrostatic discharge path from the outer surface of each OSR to the spacecraft ground. The size of the OSR tile is maximized relative to the inter-tile spacing, to achieve the greatest ratio of reflective-to-nonreflective surface.

5 Claims, 5 Drawing Sheets

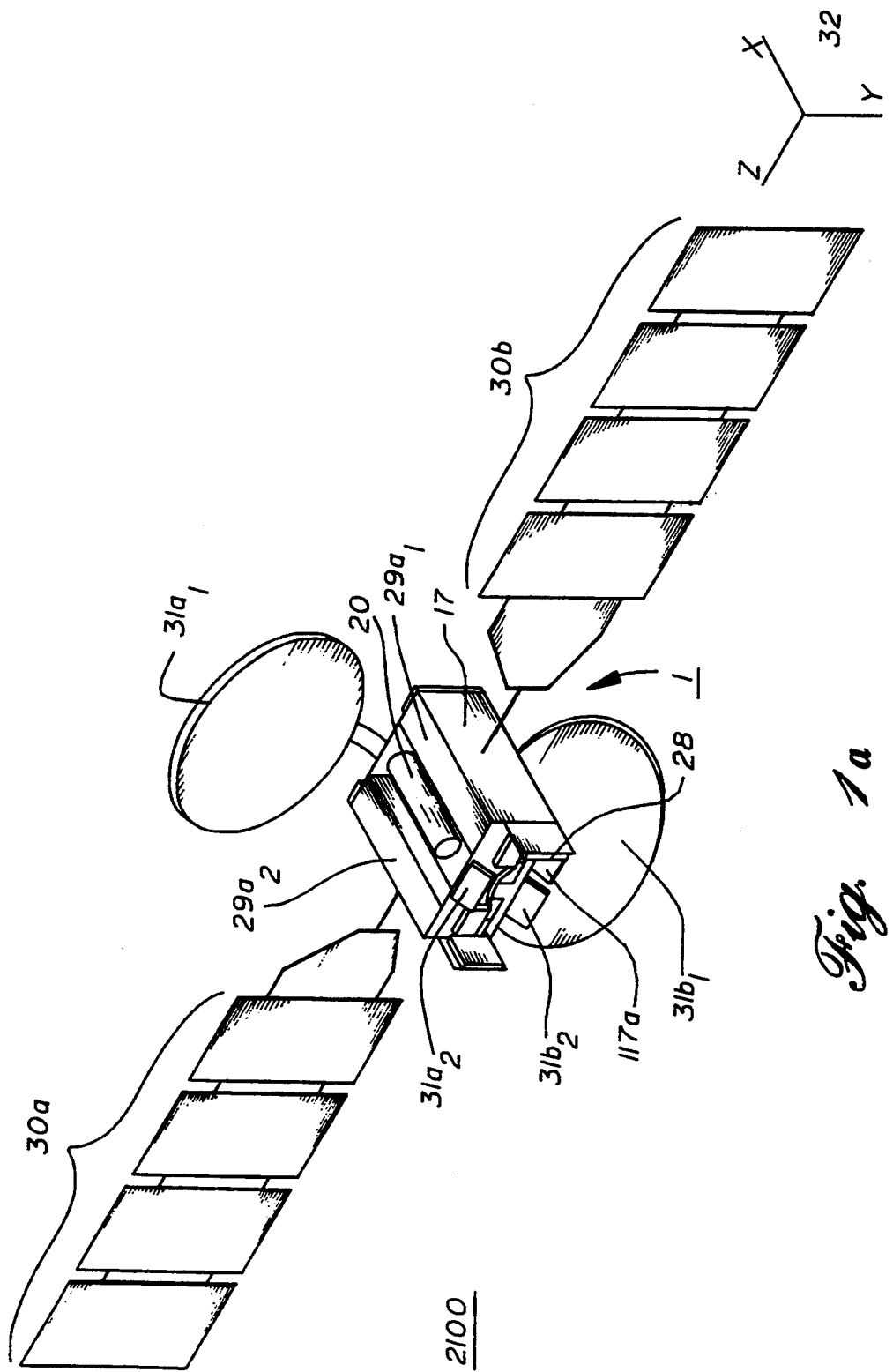

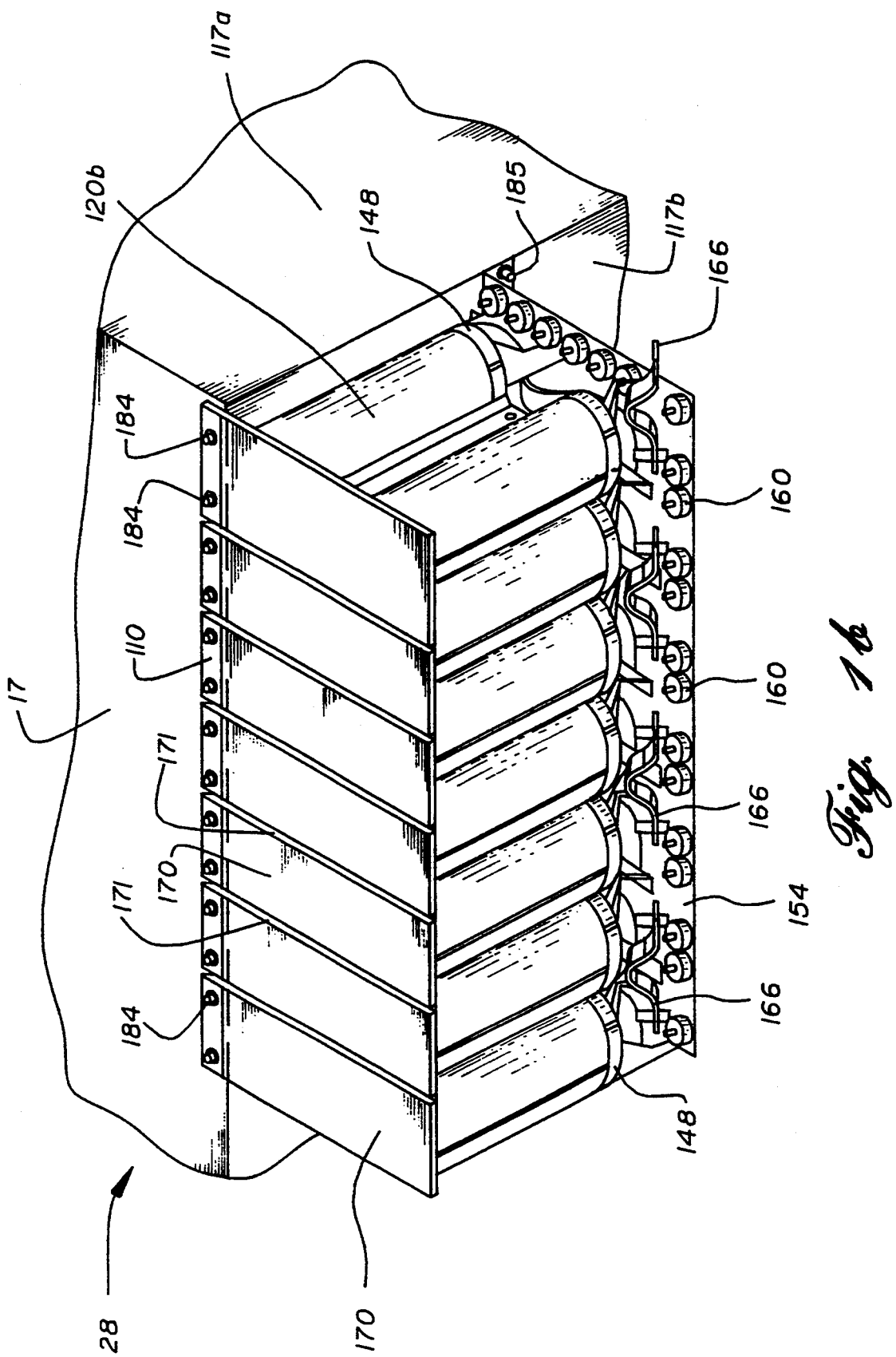

OPTICAL SOLAR REFLECTOR AND MOUNTING METHOD

BACKGROUND OF THE INVENTION

This invention relates to optical solar reflectors (OSRs) for spacecraft, and to methods for mounting to the body of a spacecraft.

An optical solar reflector (OSR) is a second-surface reflector on a transparent substrate, which is attached to the outer surfaces of a spacecraft for (a) reflecting solar energy incident on the spacecraft (reflection), and (b) radiating heat energy produced in the spacecraft (emission). In the past, glass or quartz OSR tiles, about 1 inch by 2 inches square and about 1/100" thick, silvered or aluminized on the second surface, and with a thin-film transparent, electrically conductive coating on the outer surface, were affixed to outer surfaces of a spacecraft by use of an adhesive resin material treated so that, when cured, it tends to retain some flexibility. The tiles were spaced apart about 1/100 inch, to allow for differential expansion and contraction. An electrically conductive material, such as a conductive silicone resin, was applied to the interstices between OSR tiles, to make electrical contact between the conductive outer surface of the tiles and the body of the spacecraft. This mounting and interconnecting procedure is labor-intensive.

Modern spacecraft tend to have higher-power payloads than older spacecraft, and therefore are often required to maintain temperature in the presence of a greater heat load than in the past. A spacecraft can ordinarily only lose energy by radiation. The radiation efficiency of the glass or quartz OSR tiles is high. However, the gaps between the OSR tiles, which contain the adhesive, are inherently good solar absorbers by comparison with the OSR tiles themselves. The presence of the gaps may result in an increase in total panel solar absorption by as much as 20%, as a result of the relatively high solar absorptance ($a$) of the gap. Also, materials in the gaps, such as epoxy resin adhesives and/or silicone paints, tend to darken upon exposure to ultraviolet radiation and charged particles, as occurs in orbit. The darkened material is a good solar absorber.

Maintenance of low weight is of utmost importance in a spacecraft, because there is a maximum allowable launch weight, and excess weight directly subtracts from payload fuel. The fuel portion of the payload of a spacecraft, such as a communications spacecraft, is used to maintain the attitude and/or station of the spacecraft. The life of the spacecraft is essentially terminated when the fuel is expended. Considering the high capital cost of a spacecraft and its launch (which at present may be upwards of 50 millions of dollars), its service value (one million dollars per month, or more) and the small amount of fuel required to maintain attitude and station (a few pounds mass (lbm) per month), the incremental cost of additional thermal control weight is very large. Improved thermal control surfaces are desired.

SUMMARY OF THE INVENTION

According to an aspect of the invention, extremely thin, flexible glass or quartz "thin optical solar reflector" (TOSR) tiles, larger than prior-art tiles, are used. In a particular embodiment of the invention, the TOSR tiles are rectangles about 3.6"×4.4", 0.0015 to 0.0020 inches thick, of ceria-doped glass. Because of the reduced inter-tile interstice (gap) area resulting from the larger area TOSR tiles, the solar absorptance is increased due to the gaps about five percent, affording better heat control. The thinness and flexibility of the tile reduce weight and allow the tile to conform to curved surfaces or irregularities, or flex when stresses bend the underlying surfaces. According to another aspect of the invention, each TOSR tile has a transparent conductive coating, as for example indium-tin oxide, applied to its space-facing broad outer surface, and lapping over the edges onto the reflective layer of the inside (spacecraft-side) broad surface, so that electrical conductivity exists between the broad outer and inner surfaces of each OSR tile. According to a further aspect of the invention, the tiles are connected to the spacecraft surface by a transfer (double-sided) adhesive sheet. This reduces weight and prevents formation of lumps of material in the interstice, which in the prior art required hand removal. In a particularly advantageous embodiment, the adhesive sheet is 0.002" thick, and is loaded with electrical conductor, so that electrical contact is made between the outer conductive surface of each TOSR tile and the surface of the spacecraft by the adhesive attachment, thereby avoiding the need for an additional step to make connections. A particular type of conductive adhesive is anisotropically conductive, with the preferred direction of conduction extending between the broad surfaces of the adhesive sheet.

DESCRIPTION OF THE DRAWING

FIG. 1a is a perspective or isometric view of a spacecraft, including a region covered by optical solar reflector tiles, and FIG. 1b is a perspective or isometric view of a portion of the spacecraft including optical solar reflector tiles, affixed to a portion of the outer surface of a spacecraft;

DESCRIPTION OF THE INVENTION

Figure 2A:
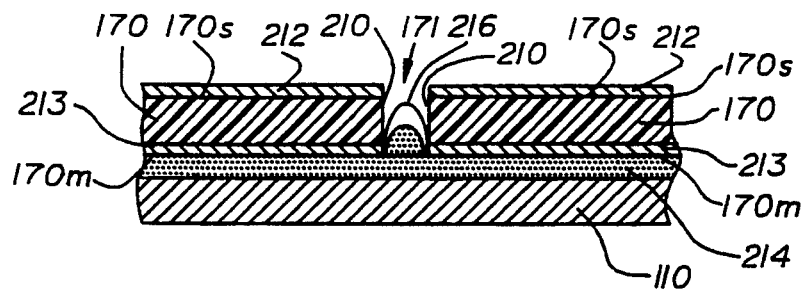
FIGS. 2a, 2b and 2c are cross-sections illustrating steps in the prior art application of an OSR tile to the spacecraft.

FIG. 1a illustrates a spacecraft, which includes a portion requiring OSR materials, either prior-art or according to the invention. In FIG. 1a, a spacecraft designated generally as 2100 includes unfurled four-section solar panels designated 30a and 30b, a body designated generally as 1, including access panels 29a1 and 29a2, an oxidizer tank 20, a first mission-dependent antenna system including a dual-polarization reflector 31a1 and its feed 31a2, and a second reflector 31b1 and its feed 31b2, all as described in a copending patent application entitled, "Battery Thermal Control Arrangement", filed Nov. 25, 1992 in the name of Homer et al, and assigned Ser. No. 07/948,229. Also illustrated in FIG. 1a is a battery assembly 28, with a generic optical solar reflector panel illustrated in greater detail in FIG. 1b. Battery assembly 28 is affixed to body panels 17 and 117a.

In FIG. 1b, battery assembly 28 includes a plurality of battery cells (not illustrated) affixed within battery support shells, one of which is illustrated as 120b. Each support shell includes a pair of two half-shells, and each pair of half-shells accommodates and holds in place two battery cells. Each pair of half-shells 120b is affixed to an aluminum mounting panel designated 110, which is held to spacecraft body panel 17 by a plurality of bolts, the heads of which are visible and some of which are designated 184. The ends of the battery cells remote from support of mounting panel 110 are supported by clamps, one of which is designated 148, which hold them to a further panel 154. Panel 154 also supports wiring, some of which is designated 166, and diodes, designated 160, much as described in the abovementioned Homer et al patent application. Further panel 154 is mounted to an additional body panel 117b by a tab and a bolt, the head of which is visible and is designated 185.

Figure 2B:
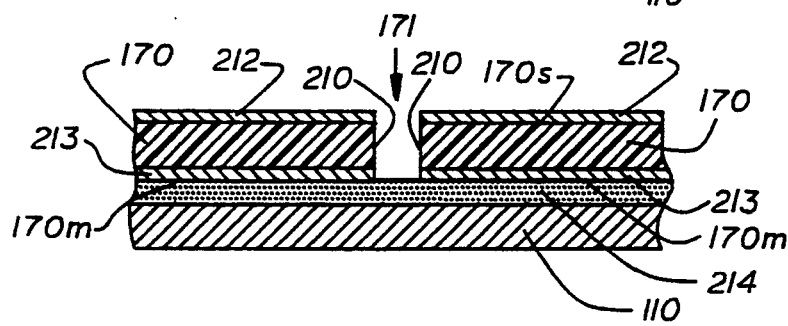
Figure 2C:
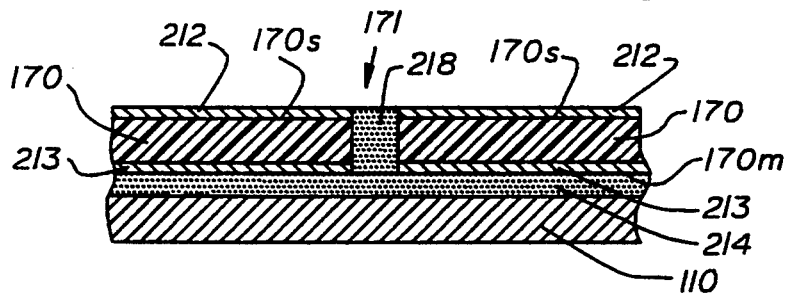

Mounting panel 110 of FIG. 1b supports a plurality of optical solar reflector (OSR) tiles 170 on its space-facing side. OSRs 170 reflect solar energy (insolation) falling on panel 110, and aid in temperature control of the spacecraft batteries by radiation due to the high emissivity of the tiles. Interstices or gaps between adjacent OSR tiles 170 are designated 171. These interstices in the prior art were relatively wide, to allow room for liquid resin extruded from below the tiles during the tile-setting procedure, and for allowing total access for clean-up. Further, interstices 171 were available to be filled with electrically conductive material for making contact among the electrically conductive outer surfaces of the tiles. FIGS. 2a, 2b and 2c are cross-sections of the region between tiles as they might be in the prior art. Elements of FIGS. 2a, 2b and 2c corresponding to those of FIG. 1b are designated by like reference numerals. FIG. 2a illustrates support plate 110, with the edges 210 of two transparent OSR tiles 170 adjacent a gap 171. Each OSR tile 170 is specified to have a transparent, electrically conductive coating 212 on its space-facing broad side 170s, which may be a coating of indium-tin oxide (ITO), and a reflective coating 213, such as silver or aluminum, on its mounting side 170m. According to one prior art mounting procedure, uncured or liquid resin 214 is applied to the bottom or spacecraft side 170m of a tile 170, and the tile is placed in position on mounting surface 110. After the tile is placed in position, it is pressed firmly to force out any air bubbles which might cause leakage or crack the OSR, and to create full contact between resin 214 and adjacent tile 170 and plate 110. This pressing operation resulted in extrusion of some of the resin from below the tile into gap 171, as illustrated by glob 216 in FIG. 2a. If the width of gap 171 were to be reduced, the pressing of the tile into position might cause glob 216 to be extruded onto the exterior surface of the OSR tile, which would necessitate time-consuming and costly cleanup. For this reason, gap 171 was maintained relatively large, on the order of 0.010 to 0.050 inches. FIG. 2b illustrates a second step in the prior-art mounting procedure, which removed at least some of glob 216. The need to introduce a tool for removal of the extruded resin in the prior art established the required minimum gap size. FIG. 2c illustrates the introduction of an electrically conductive material 218 into gap 171, to make contact between electrically conductive outer layer 212. The nonconductive nature of adhesive resin 214, and its variable thickness, prevented making contact between conductive filler 218 and spacecraft mounting panel 110. At some location (not illustrated), a separate electrical connection was made between conductive outer layer 212 and spacecraft body panel 110, to provide a positive connection and thereby reduce the possibility of a damaging arc.

According to an aspect of the invention, a sheet of transfer adhesive is applied to either the OSR tile or to the spacecraft mounting panel, to thereby provide a substantially uniform thickness of adhesive. The adhesive thickness is minimized to reduce weight, and may for example be 0.002 inches. Since the very thin adhesive layer according to the invention might result in lack of contact due to surface irregularities if rigid OSR tiles were used as in the prior art, extremely thin, flexible TOSR tiles are used in conjunction with the thin adhesive. Since the transfer adhesive sheet does not extrude, there is no need to maintain a wide intersticial gap into which material can extrude, and the TOSR tiles may be placed closer together, thereby reducing the ratio of nonreflecting gap area to high-emission, reflective tile area. For a prior-art OSR tile 1"×1" with gap width of 0.010, the ratio of useful area to total area may be calculated as the ratio of the tile area to the area of the tile plus gap, which is $1/(1.01 \times 1.01)$, which corresponds to 98%. If the interstitial gap is larger, the percentage of useful area is correspondingly decreased. According to the invention, the percentage is increased to about 99.5% for a 4"×4" TOSR tile, or possibly even more. This improved usage of the panel surface is achieved by using a much larger tile than in the prior art, on the order of 112 cm by 92 cm (3.6×4.4 inches), or larger. Such a large tile, if it were as thick as the prior art tile, namely about 0.003 to 0.008 inch, could not be applied, because its rigidity would be so great that it could not fully conform to the normal range of surface irregularities, and it would either crack under applied pressure during setting, or if the pressure were reduced, might leave adhesive voids. Such voids prevent thermal contact between the spacecraft and the tile, which might tend to affect heat transfer for radiation by the tile. According to an aspect of the invention, the TOSR tile is about 0.0015 inches thick, or less, which results in a flexibility sufficient for the tile to be bent into a semicircular shape over its length. The amount of labor required to apply such large tiles is less than that required to apply the small prior art tiles, because fewer tiles are required to cover a given area.

Figure 3:
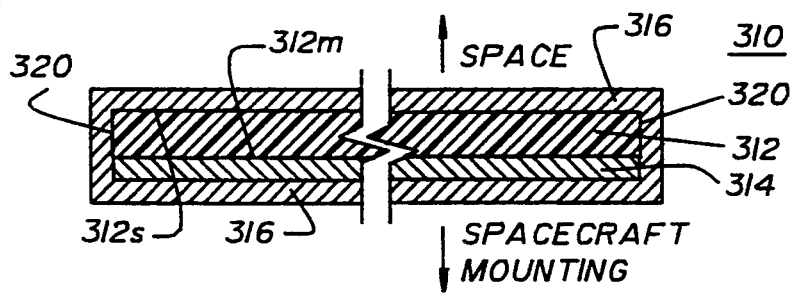
FIGS. 3 and 6 are cross-sections illustrating TOSR tiles according to the invention.

A further cost reduction is achieved by controlling the need for application of electrically conductive material to make the electrical contact among the conductive outer surfaces of the tiles. More particularly, each tile is fabricated with the electrically conductive surface, which may be ITO, extending over the space-facing front surface of the tile, and extending over edges 210 and onto the mounting side of reflective coating 213, as illustrated in the cross-section of FIG. 3. In FIG. 3, a TOSR tile 310 includes a 1.5-mil-thick ceria-doped glass microsheet substrate 312 such as Corning Type 0213, about 3.4×3.4 inches square. An equivalent material is made by Pilkington Space Technology, Kinmel Park Industrial Estate, Bodelwyddan, Rhyl, Clwyd, LL18 5TY, United Kingdom. Substrate 312 defines a broad front or space-facing side 312s, a broad spacecraft or mounting side 312m, and edges 320. A 1000 Å vapor-deposited layer 314 of silver on the spacecraft side 312m forms a second-surface reflector. A vapor-deposited layer 316 of electrically conductive indium oxide or indium-tin oxide, with a thickness of about 50 to 200 Å on the front side 312s, laps over edges 320 and onto reflective coating 314, and has a thickness of about 300

Å on the mounting side. Conductive coating 316 provides a positive electrical interconnection between front and mounting surfaces.

Figure 6:
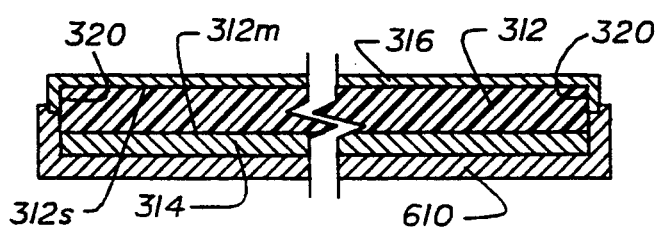

FIG. 6 illustrates an alternative embodiment of a TOSR tile according to the invention. Elements of FIG. 6 corresponding to those of FIG. 3 are designated by like reference numerals. In FIG. 6, a glass or quartz tile 312 has a reflective coating 314 affixed to its spacecraft mounting side 312m. As in the case of FIG. 3, a layer 316 of transparent, electrically conductive material is coated onto its space-facing side 312s, and laps onto the edges 320 of the tile. An electrically conductive protective layer 610 of nichrome or inconel is deposited over reflective layer 314, and extends to, and laps over edges 320 and layer 316, to provide both protection of the reflective layer and electrical continuity between front and rear surfaces of the tile. In the embodiments of FIGS. 3 AND 6, the reflective layer need not be conductive, since conductivity is provided by ITO layer 316 or by protective layer 610, respectively.

Figure 4:
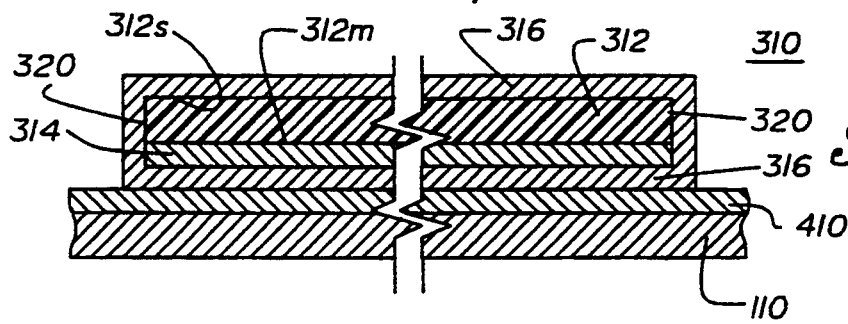
FIG. 4 is a cross-section of a TOSR tile as in FIG. 3, mounted by the use of a transfer adhesive.

According to an aspect of the invention, conductive transfer adhesive is used, as in FIG. 4, to connect the mounting side of a prior-art OSR tile or the TOSR tile of FIG. 3 to the spacecraft. Elements of FIG. 4 corresponding to those of FIG. 3 are designated by like reference numerals. In FIG. 4, a layer 410 of double-sided, electrically conductive transfer adhesive is applied to the outer surface of spacecraft mounting panel 110. TOSR tile 310 is adhesively affixed to panel 110 by conductive adhesive layer 410. A suitable transfer adhesive is type 9703, which has a thickness of 0.001 inches, and is manufactured by Minnesota Mining & Manufacturing Co.

The electrically conductive type 9703 adhesive tends to be anisotropic, in that the conductive filler is in the form of strands which extend laterally, from one broad surface of the adhesive to the other, thereby providing a preferred direction of conduction from one broad surface of the adhesive to the other.

The ultrathin adhesive layer according to the invention has the additional advantage of providing a close and uniform thermal coupling of the TOSR tile to the spacecraft skin or panel facesheet.

As so far described, the spacecraft panel on which the TOSRs are mounted has been a metal such as aluminum, which is electrically conductive. However, the mounting panel may be a composite material such as a reinforced epoxy resin, so long as the fill material of the composite material is sufficiently conductive. A suitable composite mounting panel material is a graphite-epoxy composite sheet, which as known may be used as a facesheet for a honeycomb panel. When a graphite-epoxy mounting sheet is used, it may be necessary to sand the surface to expose the conductive filler before applying the tiles according to the invention.

Figure 5A:
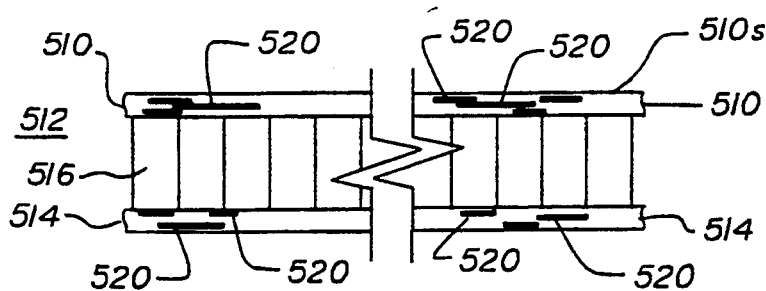
FIGS. 5a–5h are cross-sections of a spacecraft panel at various states during application of TOSR tiles according to the method of the invention.
Figure 5B:
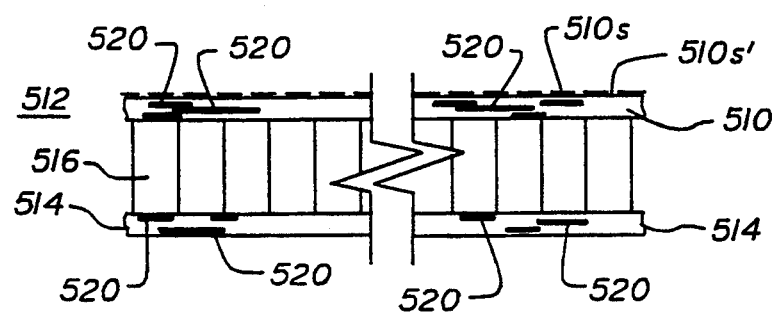

FIGS. 5a–5f represent steps in the application or mounting of a tile in accordance with as aspect of the invention. FIG. 5a represents a cross-section of a honeycomb panel 512 including face sheets 510 and 514, spaced apart by a honeycomb section 516. As illustrated in FIG. 5a, face sheets 510 and 514 are a carbon-fiber or graphite-reinforced epoxy composite. Electrically conductive fibers, some of which are represented as fibers 520, lie within the composite material of each face sheet 512, 514. The fibers may be woven or chopped. The resin of the composite material of face sheet 510 may insulate the outer surface 510s of face sheet 512. FIG. 5b is similar to FIG. 5a, representing the result of a surface removal step, as by sanding. The original surface 510s is indicated by a dash line, and the new outer surface is designated 510s$^1$. The sanding step represented by FIG. 5b exposes the conductive fibers 520 in the resin/fiber composite. The residue from the sanding is then cleaned off. The sanding step represented by FIG. 5b may be dispensed with if conductive surface sheet 510 is a metal, such as aluminum, although additional cleaning may be necessary. It is also noted that the surface of aluminum forms a thin, nonconductive oxide, which does not ordinarily cause a contact problem, but which in special circumstances might require an equivalent of the sanding step.

Figure 5C:
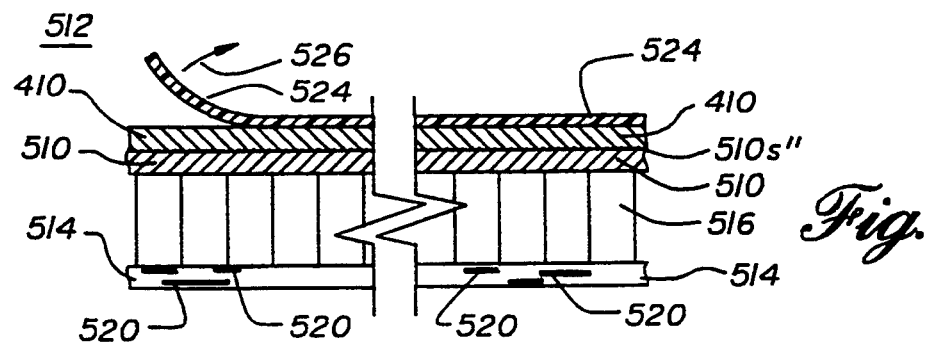

FIG. 5c represents the application to upper surface 510s$^{11}$ of a surface of a transfer adhesive sheet 410 and one of its surface protective sheets 524, followed by the peeling away of protective sheet 524, as represented by arrow 526. A sheet of slippery or non-stick material 530 is temporarily placed in position at the location 532 where the edge of the OSR tile is to be applied. The material of sheet 530 might be tetrafluoroethane (TEFLON) or some other material, depending upon the nature of the adhesive of sheet 410. FIG. 5e illustrates the application of flexible TOSR 310 over slippery sheet 530, and placement of its edge at the desired location 532. The edge of TOSR 310 is pressed into contact with adhesive 410 at location 532. Slippery sheet 530 can then be pulled to the left in FIG. 5e, in the direction of arrow 540, to thereby expose an increasing portion of the lower surface of TOSR 310 to the adhesive. As slippery sheet 530 is withdrawn, TOSR 310 is pressed into contact with adhesive sheet 410 in the exposed region. This method of application tends to prevent the appearance of wrinkles in the finished surface. FIG. 5f represents the result of the process of FIGS. 5a–5e.

Figure 5D:
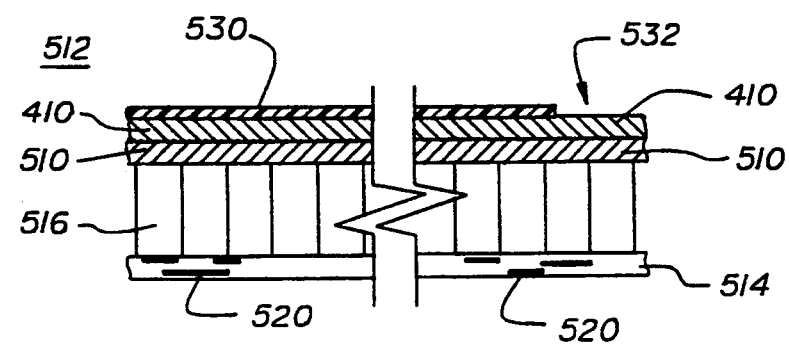
Figure 5E:
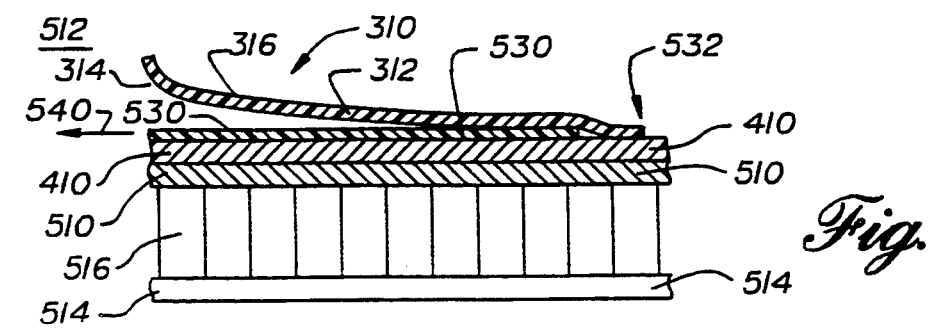
Figure 5F:
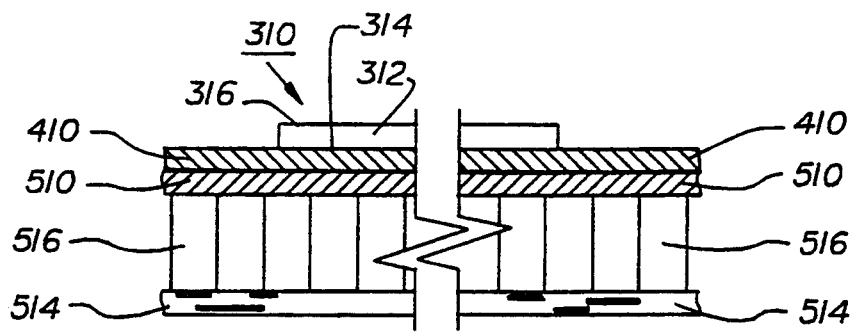
Figure 5G:
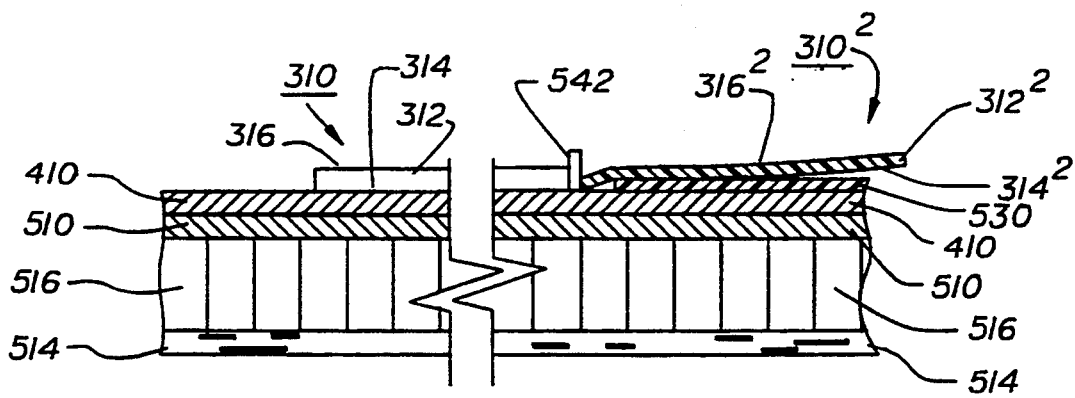
Figure 5H:
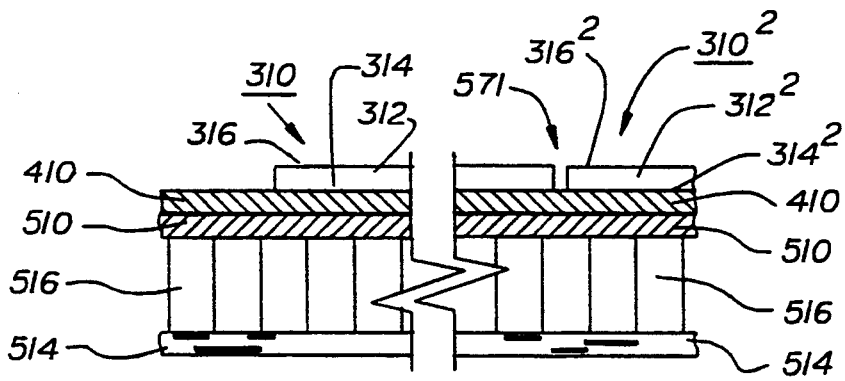

Following application of tile 310 as described in conjunction with FIGS. 5d and 5e, to form the structure of FIG. 5f, a second tile may be added, by applying spacing blocks, such as block 542 of FIG. 5g, along the edge to be joined, to establish the separation between tiles. Since there is no extrusion of adhesive, the gap defined by block 542 may be much smaller than in the prior art, limited only by the thermal expansion of the tiles at the highest expected temperature to which they will be exposed. The reduced area of the gap reduces the low-emission, high-absorption portion of the total surface as described above, thereby improving the thermal control. The spacers blocks 542 are temporarily held in position by the adhesive. Slippery sheet 530 is again applied over the adhesive surface to which the TOSR tile is to be adhered, as illustrated in FIG. 5g. Another TOSR tile 310$^2$ is applied, and the slippery sheet withdrawn, as illustrated in FIG. 5h, to bring the lower surface 314$^2$ of TOSR tile 310$^2$, with its reflective and conductive layers, into contact with the adhesive, leaving a small gap 571.

A preferred electrically conductive transfer adhesive tape is 3M type 9703. Nonconductive transfer adhesive tapes can be used, such as 3M type Y966, but further steps must then be taken, as in the prior art, to make the necessary electrical connections.

As described in conjunction with FIGS. 5a–5h, a single type of transfer adhesive is used. If the advantages of the electrically conductive transfer adhesive are desired, and its cost is judged to be high, the TOSRs may be held by alternating strips of electrically conductive and conventional nonconductive transfer adhesive of the same thickness, with the only limitation being that a portion of the electrically conductive adhesive must underlie a conductive portion of each TOSR tile, so that electrical contact is made therewith. This arrangement has been found to be particularly advantageous when difficulty is experienced with wrinkling of large areas of the conductive adhesive. A suitable nonconductive transfer adhesive is 3M type Y966. While the adhesive has been described as being applied to the mounting surface, those skilled in the art will immediately recognize that it may instead by applied individually to each tile.

Other embodiments of the invention will be apparent to those skilled in the art. For example, while a continuous coating of electrically conductive material has been described as extending over the entirety of the back or spacecraft mounting side of the tile, the electrically conductive coating needs to extend only onto so much of the back surface as will provide electrical conduction to the spacecraft.

What is claimed is:

1. A spacecraft, comprising:
   a body including an outer surface which may be subjected to solar radiation and a flux of charged particles;
   a thin, transparent, electrically nonconductive sheet, defining first and second broad surfaces, and at least one edge surface, said first broad surface being coated with a first transparent, electrically conductive layer to form an outer surface of said sheet, said second broad surface being coated with at least a reflective layer to form a reflective surface, and said edge surface being coated with a first deposit of an electrically conductive material in electrical contact with said transparent, electrically conductive layer on said first broad surface, said first deposit extending at least partially onto said second broad surface; and
   a layer of adhesive material different from said electrically conductive material of said first deposit, said layer of adhesive being of substantially constant thickness, and including a first broad surface and a second broad surface, said second broad surface being larger than said first broad surface of said electrically nonconductive sheet, said first broad surface of said layer of adhesive being affixed to said reflective surface, and said second broad surface being affixed to said outer surface of said spacecraft body, said layer of adhesive being electrically conductive and in electrical contract with said first deposit, for providing a path for the flow of current between said outer surface of said sheet and said outer surface of said spacecraft body by way of said first deposit of said electrically conductive material.

2. A spacecraft according to claim 1, wherein said reflective layer is electrically conductive, and in electrical contact with said first deposit of electrically conductive material coating said edge surface.

3. A spacecraft according to claim 1, wherein said thin, transparent, electrically nonconductive sheet is generally rectangular, and said at least one edge surface is four edge surfaces.

4. A spacecraft according to claim 1, wherein said thin, transparent, electrically nonconductive sheet is a glass sheet.

5. A spacecraft according to claim 1, wherein said layer of adhesive is Minnesota Mining and Manufacturing Company type 9703.

* * * * *